GATE CIRCUIT WITH MEANS FOR INHIBITING OUTPUT SIGNALS

Filed Aug. 9, 1965

INVENTOR
JAMES L. PHILLIPS
BY Howard Levine
ATTORNEY 3,437,843

GATE CIRCUIT WITH MEANS FOR INHIBITING OUTPUT SIGNALS

James L. Phillips, Dallas, Tex., assignor to Texas Instruments Incorporated, Dallas, Tex., a corporation of Delaware Filed Aug. 9, 1965, Ser. No. 478,268
Int. Cl. H03k *17/00*
U.S. Cl. 307—254 5 Claims

ABSTRACT OF THE DISCLOSURE

A gate circuit is disclosed which is capable of transmitting a signal from the input terminal to the output terminal thereof, except during the application of an inhibiting pulse to the gate circuit, during which substantially no output signal is transmitted to the output terminal.

This invenion relates to gate circuits and more particularly to a gate circuit capable of transmitting a signal of positive or negative polarity except during the application of an inhibit pulse to the gate circuit.

The gate circuit of the invention acts as a switch, transmitting a signal from the input of the circuit to the output thereof, except for the period during which an inhibit or "gate" pulse is applied to a control terminal of the circuit. In such a gate circuit it is important that there be little feedthrough of the gate pulse to the output of the circuit; that is, the effect of the gate pulse on the shape of the output waveform should be limited to reducing the output signal to zero. An example of undesirable feedthrough can be seen in a gate circuit wherein the output signal is the A.C. component of the collector voltage of a transistor amplifier stage, capacitive output coupling being used to block the D.C. component. In such an A.C. circuit, if the application of the inhibit pulse results in a shift in the D.C. operating voltage level at the collector, the change will be coupled to the output of the circuit by the capacitor and will appear as a pulse in the A.C. output of the gate circuit. If such a D.C. shift can be avoided, the A.C. output will merely decrease to zero without the appearance of any extraneous pulse at the output terminal.

Therefore, it is an object of the invention to provide a gate circuit capable of transmitting a signal from the input terminal to the output terminal thereof, except during the application of a gate pulse, during which substantially no portion of the output signal and no position of the gate pulse appear at the output terminal.

Other objects, features, and advantages of the invention will become apparent from the following detailed description when read in conjunction with the appended claims and attached drawing, in which:

Figure 1:
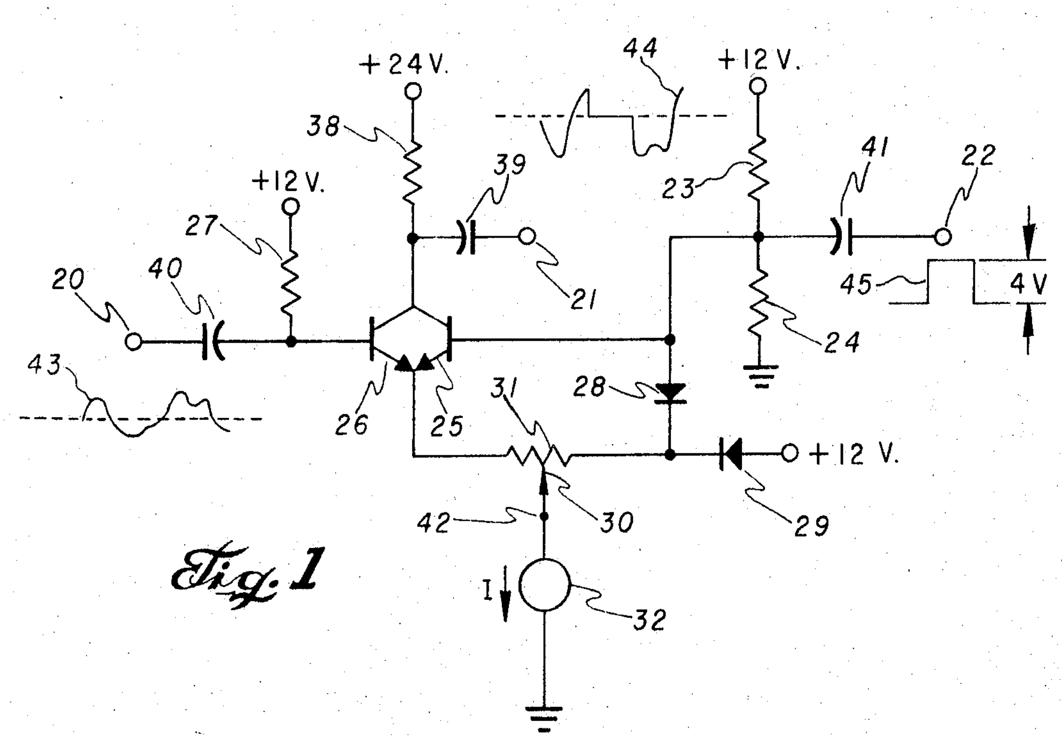
FIGURE 1 is a schematic diagram of a gate circuit according to the invention.

The operation of the gate circuit of FIGURE 1 is, broadly, to transmit the A.C. component of the signal appearing at input terminal 20 in amplified, inverted form to output terminal 21, except during those periods when the gate signal appears at terminal 22. During such periods the output at terminal 21 falls substantially to zero.

The gain from terminal 22 to terminal 21 may be designed to suit the purpose for which the gate circuit is to be used. In FIGURE 1 there have been included typical voltage levels and illustrative waveforms to clarify the explanation of the gate circuit operation. Waveform 43 illustrates an input voltage to the gate circuit, while waveform 45 represents a gate pulse and waveform 44 represents the resulting output voltage of the gate circuit.

The input voltage at terminal 20 may contain both positive and negative voltage excursions, but the maximum positive and negative values thereof must be known before the parameters of the gate circuit can be determined. Once the maximum excursion values are known, the values of voltage divider resistors 23 and 24 can be selected to provide an appropriate bias for any given voltage source, for example +12 v., connected to resistor 23. To successfully transmit each input pulse applied at terminal 20 to output terminal 21, the value of such bias at the base of transistor 25 should be more negative than any voltage which will be produced at the emitter of transistor 26 due to the input fluctuations at input terminal 20. For example, resistor 27 connected to a +12 v. source, may be selected to establish a bias at the base of transistor 26 which is only slightly less than +12 v. Then, if it is known that the most negative excursions of the transistor 26 base voltage due to the input at terminal 20 will not reduce the emitter voltage thereof below +10 v., the bias at the base of transistor 25 may be set slightly below +10 v. Thus, in the absence of a gate pulse, transistor 25 will not conduct, its base-emitter junction not being forward biased. Under such conditions, transistor 26 conducts and acts as an amplifier with input at terminal 20 and output at terminal 21. Capacitors 39 and 40 merely provide A.C. coupling at the output and input of the amplifier, respectively, suppressing any D.C. components in the signal to be transmitted from terminal 20 to terminal 21.

Diode 29 is biased to conduct in the absence of a gate pulse at terminal 22. Such biasing can be achieved by selecting the resistance from the joint terminal of the emitters of transistors 25 and 26 to the wiper arm 30 of variable resistor 31 so that the most positive voltage occurring at wiper arm 30 as a result of the input at terminal 20 is less than +12 v. Thus, diode 29 will be forward-biased and will conduct in the absence of a gate pulse. The voltage at the anode of diode 28 should be set, by resistors 23 and 24, to be more negative than the potential at the cathode of diode 29, rendering diode 28 non-conducting in the absence of a gate pulse at terminal 22. For example, if the voltage at the junction of resistors 23 and 24 is set slightly below +10 v., as assumed by way of illustration above, diode 28 would be sufficiently back-biased, since the voltage at the cathode of diode 29 is only slightly less than +12 v. When the latter diode is conducting. It is seen that, in the absence of the inhibit pulse, the current supplied by constant current source 32 divides between transistor 26 and diode 29. When the input at terminal 20 causes transistor 26 to draw more current, diode 29 draws less, maintaining a constant current through source 32.

Figure 2:
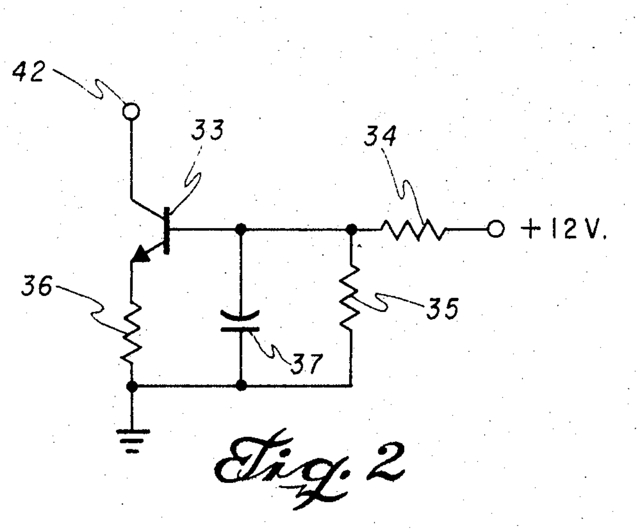
FIGURE 2 is a schematic diagram of a constant current source suitable for use with the gate circuit of FIGURE 1.

FIGURE 2 illustrates a simple circuit for performing the function of the constant current source 32. To the base of transistor 33 is applied a voltage set by resistors 34 and 35. The collector current to be drawn by transistor 33 is established by the size of resistor 36, which fixes the base current thereof. A capacitor 37 tends to eliminate voltage fluctuations at the base of transistor 33 which would disturb the constant value of the collector current. Although the function of constant current generator 32 could be performed by a large resistor connected from point 42 to ground, there is much less gate pulse feedthrough to output terminal 21 when the circuit of FIGURE 2 is used. If merely a large resistor is used, the current from terminal 42 to ground will exhibit some variation upon the application of the gate pulse, resulting in a variation of the D.C. voltage level at the collectors of transistors 25 and 26. The D.C. voltage level variation appears at output terminal 21 as an undesired voltage step during the gate pulse.

The size of the gate pulse to be applied to terminal 22 depends on the bias at the base of transistor 26 and the maximum voltage which will be applied to input terminal 20. The gate pulse must be large enough so that, when the pulse is applied, the voltage at the emitter of transistor 25 will exceed the most positive potential which will be applied to the base of transistor 26. For illustration, assuming as previously described that the input pulse applied to terminal 20 will not reduce the voltage at the emitters of transistors 25 and 26 below +10 v., and further assuming that a +4 v. pulse applied to terminal 22 fulfills this requirement, a +4 v. pulse, coupled by capacitor 41 to the junction of resistors 23 and 24, causes the potential at the base of transistor 25 to reach +14 v. Since the voltage at its base causes it to be forward-biased rather than back-biased, as in the absence of a gate pulse, transistor 25 conducts. The voltage at the emitters of transistors 25 and 26 is only slightly less than +14 v. and is more positive than any voltage occurring at the base of transistor 26. Hence, the base-emitter junction of transistor 26 is back-biased on the application of the inhibit pulse, and said transistor is cut off. Consequently, the signal applied at terminal 20 is not transmitted to terminal 21 for the duration of the gate pulse.

As the gate pulse is applied to terminal 22 and transistor 25 begins to conduct, diode 28 likewise begins to conduct. Since the voltage at the cathode of diode 28 is only slightly less than the +14 v. at its anode, diode 29 is back-biased and is therefore cut off during the gate pulse.

If the components of the gate circuit are selected so that transistor 25 draws the same amount of the constant current from source 32 during the gate pulse as transistor 26 would draw in the absence of the gate pulse, and with no input signal applied at terminal 20, the D.C. component of the current through resistor 38 would be the same with and without the application of the gate pulse. Consequently, such a selection of components avoids the appearance of a pulse at terminal 21 as the result of a D.C. voltage shift at the collector of transistor 25. Thus, in accordance with an object of the invention, the gate circuit interrupts the transmission of signals from terminal 20 to terminal 21 without introducing substantial feedthrough of the inhibit or gate pulse to the output signal at terminal 21. The only effect of the gate signal on the output voltage at terminal 21 is to reduce that voltage to zero for the duration of the gate pulse.

The requirement that the D.C. component of the current through resistor 38 should be the same with or without the application of the gate pulse can be largely met by matching transistors 25 and 26 and matching diodes 28 and 29. If the transistors or the diodes are not matched, resistor 30 should be adjusted so that any tendency of transistor 25 to draw more current upon the application of the gate pulse than does transistor 26 when conducting is met by a tendency for the current in diode 28 to increase by the same increment above the current which flows in diode 29 in the absence of a gate pulse. Since the current through source 32 is constant, neither the current through transistor 25 nor the current through diode 28 will increase above the current which flows in transistor 26 and diode 29, when conducting. Instead, transistor 25 will draw the same current as does transistor 26, and diode 28 the same as does diode 29 because of the balance provided by resistor 31. When the D.C. component of current through transistor 25 is thus made to be the same as the current which flows through transistor 26, gating action without gate signal feedthrough results, as previously described.

It is to be understood that the above-described embodiment is merely illustrative of the application of the principles of the invention. Numerous other arrangements may be derived by those skilled in the art without departing from the spirit and scope of the invention as defined in the appended claims.

What is claimed is:

1. A gate circuit which comprises first and second transistors having a current output circuit in common, said first transistor being responsive to an input signal to transmit said signal to said output circuit, diode means, current source means operative to divide the current thereof between said first transistor and said diode means, and means responsive to a gate signal for dividing the current of said source between said second transistor and said diode means, whereby the transmission of said input signal is suppressed for the duration of said gate pulse.

2. A gate circuit which comprises first and second transistors having a current output circuit in common, said first transistor being responsive to an input signal to transmit said signal to said output circuit, first and second diodes, a constant current source operative to divide the current thereof between said first transistor and said first diode, and means responsive to the application of a gate pulse to said second transistor and to said second diode for dividing the current of said source between said second transistor and said second diode whereby the transmission of said input signal is suppressed for the duration of said gate pulse.

3. A gate circuit which comprises first and second transistors having a current output circuit in common, said first transistor being responsive to an input signal to transmit said signal to said output circuit, diode means, current source means connected to said transistors and to said diode means to establish one part of the source current in said first transistor and another part thereof in said diode means whereby upon the application of a gate signal to said gate circuit the potential at the commoned emitters of said first and second transistors established thereat by said one part of said source current in said first transistor is changed to render said first transistor nonconductive and thereby prevent the transmission of said input signal to said output circuit for the duration of said gate pulse, and render said second transistor conductive to establish a circuit for said one part of said source current for the duration of said gate pulse.

4. A gate circuit which comprises first and second transistors having the emitters thereof interconnected and the collectors thereof interconnected, said first transistor being responsive at the base thereof to an input signal to transmit said signal to an output terminal, first and second diodes, a constant current source connected to said transistors and to said diodes, means for biasing said transistors and said diodes whereby the current of said source is divided between said first transistor and said first diode and whereby upon application of a gate pulse to said second diode and to the base of said second transistor said current is divided between said second transistor and said second diode, thereby suppressing the transmission of said input signal for the duration of said gate pulse.

5. A gate circuit which comprises first and second transistors, first and second diodes, a constant current source, a first resistance connected from the joined emitters of said first and second transistors to a terminal of said source, a second resistance connected from said terminal to the joined cathodes of said first and second diodes, an output terminal connected jointly to the collectors of said first and second transistors, a source of potential connected to the anode of said first diode, a first biasing means connected to the base of said first transistor and a second biasing means connected to the base of said second transistor and the anode of said second diode, the current from said constant current source dividing between said first transistor and said first diode to enable said first transistor to transmit an input signal applied at the base thereof to said output terminal, whereby upon the application of a gate pulse to said second biasing means the current from said constant current source divides between said second transistor and said second diode to disable said first transistor and enable said second transistor, thereby to suppress the transmission of said input signal for the duration of said gate pulse.

References Cited

UNITED STATES PATENTS 2,894,150 7/1959 Bopp -------------- 307—237

OTHER REFERENCES

Hurley, Transistor Logic Circuits, 1961 (pp. 239–243).

ARTHUR GAUSS, *Primary Examiner.*

D. D. FORRER, *Assistant Examiner.*

U.S. Cl. X.R.

307—217, 237, 253